July 1, 1958
G. L. COTTER
2,841,447
ELECTRO-PNEUMATIC BRAKE APPARATUS
Filed March 26, 1954
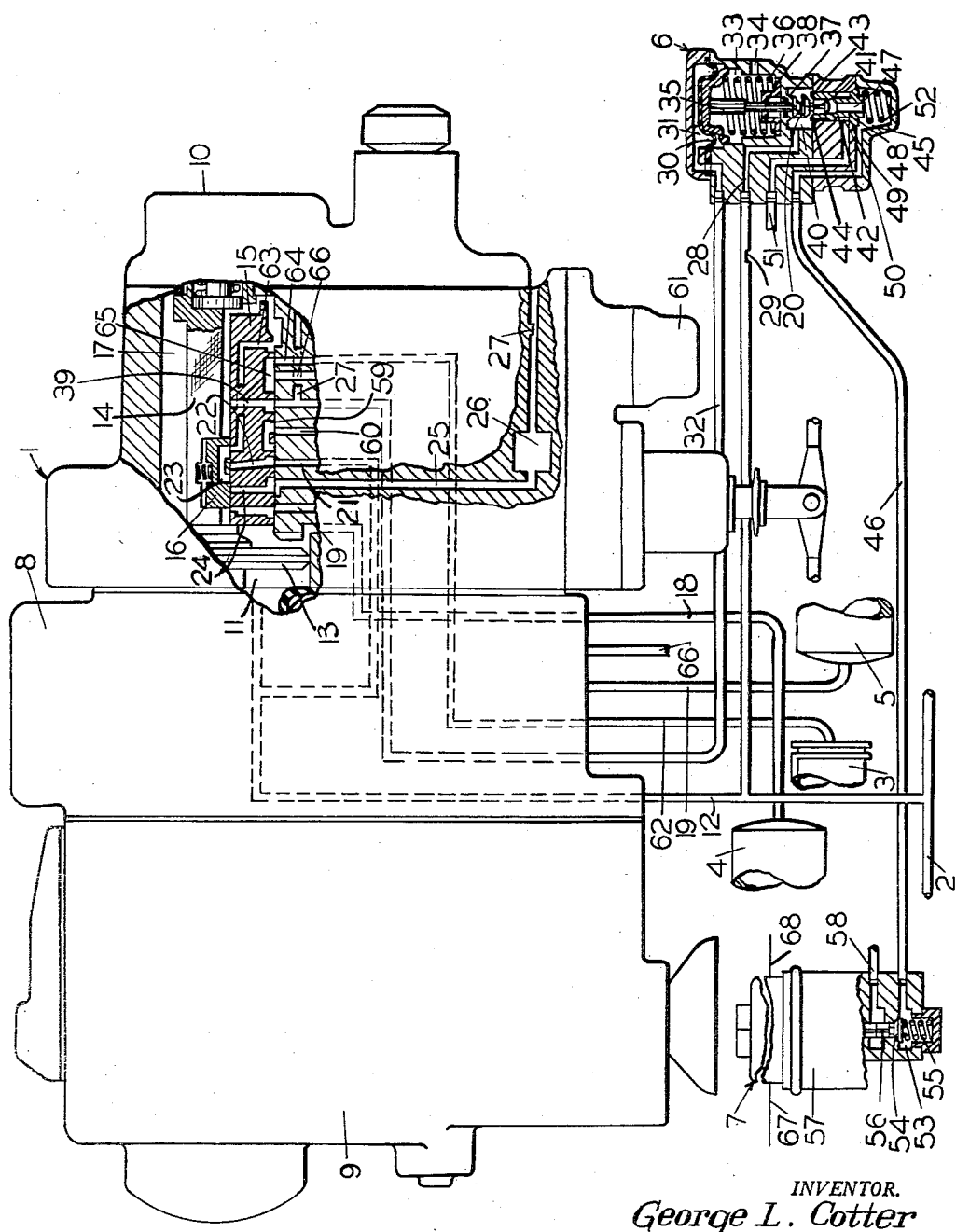
INVENTOR.
George L. Cotter
BY
Adelbert A. Steinmiller
ATTORNEY

United States Patent Office 2,841,447
Patented July 1, 1958

2,841,447

ELECTRO-PNEUMATIC BRAKE APPARATUS

George L. Cotter, Pittsburgh, Pa., assignor to Westinghouse Air Brake Company, Wilmerding, Pa., a corporation of Pennsylvania Application March 26, 1954, Serial No. 419,055

1 Claim. (Cl. 303—15)

This invention relates to fluid pressure brake equipment for controlling the application and release of brakes on a railway vehicle such as an equipment of the type disclosed in Patent No. 2,031,213 issued to Clyde C. Farmer on February 18, 1936, and more particularly to electro-pneumatic quick service mechanism for accelerating an increase in the application of the brakes on the cars in a train.

The principal object of the invention is to provide an auxiliary quick service mechanism adapted to be associated with a brake controlling valve device, which mechanism is adapted to be separately mounted and operative after a service application of the brakes has been made to induce additional service application of the brakes.

Another object is to provide an improved electrically propagated quick service application means for the above type of brake equipment which will permit an additional application of the brakes to be initiated from the locomotive regardless of the difference in brake pipe pressure between the front and the rear of the train.

Other objects and advantages will appear from the following detailed description of the invention taken in connection with the accompanying drawing, which is a diagrammatic view, partly in section and partly in outline, of a fluid pressure brake equipment embodying the invention.

As shown in the drawing, the fluid pressure brake equipment may be of the type disclosed in the aforementioned Farmer patent, which equipment comprises a brake controlling valve device 1, a brake pipe 2, a brake cylinder device 3, an auxiliary reservoir 4, an emergency reservoir 5, an interlock valve device 6 and a magnet valve device 7.

The various parts and devices of the equipment are of substantially the same construction and function in substantially the same manner in controlling the application and release of the brakes as the corresponding parts and devices of the equipment disclosed in the aforementioned Farmer patent. That is to say, the equipment operates upon a service reduction in brake pipe pressure to connect auxiliary reservoir 4 to brake cylinder device 3 to effect a service application of the brakes, upon an emergency reduction in brake pipe pressure to connect both auxiliary and emergency reservoirs 4 and 5, respectively, to said brake cylinder device to effect an emergency application of the brakes, and upon a subsequent increase in brake pipe pressure to connect said brake cylinder device to atmosphere to effect a release of the brakes and to also charge said reservoirs with fluid under pressure.

The brake controlling valve device 1 comprises a pipe bracket 8, on one face of which is mounted an emergency portion 9, and on the opposite face of which is mounted a service portion 10. The service portion 10 comprises a casing having a piston chamber 11 connected through a passage and pipe 12 to brake pipe 2 and containing a piston 13 provided with a stem 14 adapted to operate a main slide valve 15 and an auxiliary slide valve 16 contained in a valve chamber 17 at the opposite side of piston 13 to chamber 11 and connected through a passage and pipe 18 to the auxiliary reservoir 4.

The service portion 10 is provided with a preliminary quick service feature in which the piston 13, in response to a relatively slight local reduction in brake pipe pressure, operates the auxiliary slide valve 16 toward the left to a position in which piston chamber 11 is connected through a passage 21, a port 22 in the main slide valve 15, a cavity 23 in the auxiliary slide valve 16, a port 24 in said main slide valve and a passage 25 to a quick service reservoir 26 which is always open to atmosphere by way of a passage and choke 27.

The interlock valve device 6 comprises a casing containing a diaphragm 30 clamped about its periphery between two sections of said casing and defining therewith at one side a control chamber 31 open to a pipe 32 which leads to the seat for main slide valve 15. At the other side of diaphragm 30 is a spring chamber 33 which is open to atmosphere through a vent port 34 and contains a diaphragm follower 35 which is held in operative contact with the diaphragm 30 by a spring 36 interposed between said follower and a partition wall 37 of chamber 33 and encircling a stem 38 formed integral with said follower.

A chamber 40, open to brake pipe 2 through a passage 28, a choke 29 and passage and pipe 12, is formed in the casing at the side of partition wall 37 opposite to chamber 33 and contains a valve 41 linked by means of a forked connection 20 to the lower end of a follower stem 38, as viewed in the drawing, which is slidably mounted in a suitable bore in said wall. The valve 41 is adapted to make seating engagement with a valve seat 43 formed on the upper end of a valve member 42 which is slidably mounted in a bore 44 formed in the casing and extending from chamber 40 to a chamber 45, the latter chamber being constantly connected to the magnet valve device 7 by way of a passage and a pipe 46. The valve member 42 is provided with a through bore 47 encircled at its upper end by the valve seat 43 and at its lower end by a valve 48, which valve is arranged for cooperation with a valve seat 49, formed in the casing at the lower end of bore 44, to control communication between chamber 45 and a chamber 50 defined by the wall of said bore and a reduced portion of said valve member and open to atmosphere tthrough a passage 51. A spring 52 is operatively mounted in chamber 45 to constantly urge the valve member 42 upwardly to a position in which communication between chamber 45 and atmosphere is closed, as shown in the drawing.

The magnet valve device 7 comprises a casing structure having a valve chamber 53 containing an exhaust valve 54 which is urged toward a normal seated position by a bias spring 55 and is operable by an armature stem 56 to an unseated position upon energization of a magnet 57, in which position chamber 53, which is constantly connected to pipe 46, is connected to atmosphere by way of passage 58.

Operation

In operation, to initially charge the equipment fluid under pressure may be supplied to the brake pipe 2 in the usual manner, in response to which the brake controlling valve device 1 will assume its release position, in which it is shown in the drawing, in whch position fluid under pressure supplied from brake pipe 2 through passage 12 to the piston chamber 11 will flow by way of a restricted passage (not shown) to valve chamber 17, whence it will flow to the auxiliary reservoir 4 by way of passage and pipe 18 and to the emergency reservoir 5.

by way of passage and pipe 19 to charge the same in the manner described in detail in the aforementioned patent. At the same time, the brake cylinder device 3 will be opened to atmosphere by a route hereinafter identified. Fluid under pressure supplied to chamber 17 will flow through a port 39 in main slide valve 15 and passage and pipe 32 to control chamber 31 in the interlock valve device 6. When the pressure of fluid thus supplied to chamber 31 becomes sufficient to overcome the opposing force of spring 36, diaphragm 30 will deflect downwardly, moving valve 41 to its seated position in contact with valve seat 43 and valve 48 to its unseated position.

At the same time as the reservoirs 4 and 5 are being charged with fluid under pressure from the brake pipe 2, fluid under pressure will also be flowing from the brake pipe 2 through pipe 12, choke 29 and passage 28 to chamber 40, and thence through bore 47 in valve member 42, chamber 45 and pipe 46 to chamber 53 which at this time is closed to atmosphere by spring 55 acting to seat valve 54 and thereby close atmospheric passage 58. It should be noted, at this point, therefore, that with the service portion 10 in release position diaphragm 30 will be deflected to its lowermost position in which valve 40 is seated and chamber 53 of magnet valve device 7 is vented to atmosphere through pipe 46, chamber 52, past valve 48, and through chamber 50 and passage 51. Thus the interlock valve device 6 completely isolates the magnet valve device 7 so that any operation of the magnet valve device prior to initial application of the brakes will not influence the operation of the rest of the brake apparatus.

In effecting an application of the brakes on a train the usual locomotive brake valve device (not shown) will be operated to effect a reduction in the usual equalizing reservoir (not shown), in response to which the usual equalizing piston valve operates in the well-known manner to effect a reduction in pressure of fluid in brake pipe 2 at the locomotive, which reduction will become effective in the brake pipe at each car, progressing serially car by car from the front to the rear of the train in the usual manner. When the pressure of fluid in piston chamber 11, as a result of the local brake pipe reduction, is reduced to slightly less than the pressure of fluid in valve chamber 17, the piston 13 will move outwardly toward service position, cutting off charging communication between chambers 11 and 17 and shifting the auxiliary slide valve 16 to its quick service position. With the main slide valve 15 remaining stationary in the position shown in the drawing and the auxiliary slide valve 16 shifted to the left to its quick service position, fluid under pressure in piston chamber 11 will flow through passage 21, port 22 in main slide valve 15, cavity 23 in auxiliary slide valve 16, port 24 in said main slide valve and a passage 25 to the quick service reservoir 26, whence it will flow to atmosphere by way of the passage and choke 27. This venting of fluid under pressure from piston chamber 11 will continue until sufficient differential is developed on piston 13 to cause the piston 13 to shift the main slide valve 15 to the left to service position, in which position port 22 is disconnected from passage 21 and a cavity 59 in the main slide valve 15 connects passage 21 to a passage 60 leading to a quick service limiting valve mechanism 61. Thus the flow of fluid under pressure from chamber 11 to quick service reservoir 26 and atmosphere is cut off and continued through cavity 59 and passage 60 to limiting valve mechanism 61, whence it will flow to brake cylinder device 3 by way of a pipe 62 until a predetermined pressure, such as ten pounds, is established in said brake cylinder device, at which time said mechanism operates to cut off further flow from brake pipe 2 to brake cylinder device 3 as described in detail in the aforementioned Farmer patent.

With the service portion 10 in service position fluid under pressure in auxiliary reservoir 4 will flow to brake cylinder device 3 by way of a connected pipe and passage 18, valve chamber 17, a service port 63 in main slide valve 15 and a passage 64 and pipe 62, until the fluid pressure in chamber 17 is reduced to a degree slightly less than that in chamber 11 at the other side of piston 13. This excess of pressure in chamber 11 acting on piston 13 will cause same to move the auxiliary slide valve 16 to service lap position, in which the auxiliary slide valve assumes the same position relative to the main slide valve 15 as that shown in the drawing while the main slide valve remains in service position. In this service lap position flow of fluid under pressure from valve chamber 17 by way of service port 63 is cut off by the auxiliary slide valve 16.

With the main slide valve 15 in service position, chamber 31 in the interlock valve device 6 will be connected to atmosphere through pipe and passage 32, a cavity 65 in said slide valve, and an atmospheric passage 66. With chamber 31 thus vented to atmosphere spring 36 will actuate diaphragm 30 to its uppermost position, as shown in the drawing, in which position brake pipe 2 will again be connected to chamber 53 in the manner hereinbefore described. Thus, with main slide valve 15 in service position, the auxiliary slide valve 16 in lap position, and quick service limiting mechanism 61 in cut-off position in response to brake cylinder pressure, further quick service activity on the part of the service portion 10 will have been completed. However, the interlock valve device 6 will be operated to a position to permit a so-called continuous or always available quick service operation of the magnet valve device 7 to become effective subsequently as will now appear.

When it is desired to increase the degree of brake application, the brake valve device will again be operated to effect, through the medium of the equalizing piston valve, an additional reduction in brake pipe pressure at the locomotive. At the same time, coincidental with the operation of the equalizing piston valve for example, magnet 57 of the magnet valve device 7 will become energized through the medium of conductors 67 and 68 by transmitter means which may be associated with the piston valve and is not shown or described herein because it does not constitute any part of this invention and is not necessary to a clear understanding of the invention. Upon energization of magnet 57 armature stem 56 will be actuated downwardly, unseating valve 54 and thus will permit fluid under pressure in brake pipe 2 to flow to atmosphere by way of pipe 12, choke 29, passage 28, chamber 40 in the valve device 6, bore 47, chamber 45, pipe 46, chamber 53 in the magnet valve device 7 and atmospheric passage 58. A reduction in fluid pressure in passage 12 will effect a like reduction in chamber 11, in response to which piston 13 will again be actuated toward the left by fluid pressure in valve chamber 17 carrying the auxiliary slide valve 16 to service position in which service port 63 will again be open to chamber 17 to permit fluid under pressure to flow from auxiliary reservoir 4 to brake cylinder 3 until opposing pressures acting on piston 13 are substantially equal, in a manner previously described. If it is desired to further increase the braking force the same steps of procedure may be followed again with the same result being obtained. Thus a continuous quick service action will be available to initiate each reduction in brake pipe pressure. Also, the electropneumatic quick service reduction in brake pipe pressure effected after a brake application has once been established will be effected throughout the train at substantially the same time as that at the locomotive without the necessity of all brake pipe fluid being vented through the equalizing piston valve. In no case will the rate of brake pipe reduction exceed the service rate established at the locomotive, because when this rate is attained, the condutcors 67, 68 will be deenergized at the equalizing piston valve. In effect, the magnet valve device 7 supplements the operation of the equalizing piston valve.

When it is desired to effect a release of the brakes on the train the brake valve device may be operated to release position to supply fluid under pressure from the locomotive to the train brake pipe 2 in the usual manner. On each car, an increase in fluid pressure in brake pipe 2 will effect an increase in fluid pressure in chamber 11 at the left-hand side of piston 13. When the pressure in chamber 11 increases sufficiently over that in chamber 17, piston 13 will actuate auxiliary slide valve 16 and then main slide valve 15 inwardly and to the right to release position, in which they are shown in the drawing. With the various parts of the brake controlling valve device 8 in release positions, fluid under pressure in brake cylinder device 3 will flow to atmosphere by way of pipe 62, passage 64, cavity 65 in main slide valve 15, and atmospheric passage 66. At the same time, fluid under pressure in brake pipe 2 will flow to valve chamber 17 by way of passage 12, piston chamber 11 and a restricted passage (not shown) and thence to auxiliary reservoir 4 and emergency reservoir 5 to charge same in the same manner as previously described in connection with initial charging. As shown in the drawing, chamber 17 will again be connected to chamber 31 in the interlock valve device 6 so that said valve device will return to and be maintained in its cut-off position in which the brake pipe 12 will be cut off from the pipe 46 by valve 41 and valve 48 will vent chamber 53 in the magnet valve device 7 to atmosphere.

Summary

From the foregoing, it will be seen that I have provided with this invention a novel and improved quick service means adapted to cooperate with the usual fluid pressure brake equipment, with only minor structural alterations thereto, which is operable to effect a local reduction in brake pipe pressure at each car equipment immediately upon operation of the locomotive brake valve device to an application position, once a brake application has been made, and thereafter, additional braking power is desired.

Having now described the invention, what I claim as new and desire to secure by Letters Patent, is:

Fluid pressure brake apparatus for a railway car comprising the combination of a normally charged brake pipe, a brake cylinder device, a normally charged auxiliary reservoir, a brake controlling valve device having a main slide valve normally in a release position wherein it establishes communication between said brake cylinder device and the atmosphere and wherein it also establishes communication from said auxiliary reservoir to a control chamber, said brake controlling valve device being operable upon reduction in brake pipe pressure from said release position to a service position wherein said main slide valve interrupts the communication between the brake cylinder and atmosphere and establishes a communication between the brake cylinder and said auxiliary reservoir to effect application of the car brakes and wherein said main slide valve interrupts the communication between the auxiliary reservoir and said control chamber and connects said control chamber to atmosphere, conduit means, interlock valve means conditioned responsively to the release of fluid pressure from said control chamber in one position in which it establishes communication between the brake pipe and said conduit means and interrupts communication between said conduit means and atmosphere and being operative responsively to the supply of fluid under pressure to said control chamber to a second position in which it interrupts communication between the brake pipe and said conduit means and establishes communication from the conduit means to atmosphere, and magnet valve means operable to vent the conduit means and thereby the brake pipe to the atmosphere so long as the interlock valve means is in its said one position, said magnet valve means being electrically controllable independently of the propagation of a pressure reduction wave through the brake pipe.

References Cited in the file of this patent

UNITED STATES PATENTS

| | | |
|---|---|---|
| 1,141,109 | Doyle | June 1, 1915 |
| 1,442,692 | McAvoy | Jan. 16, 1923 |
| 2,137,018 | Hewitt | Nov. 15, 1938 |